April 16, 1963  L. M. HANDLEY  3,085,394
ROCKET PROPELLANT INJECTOR

Filed June 17, 1959

INVENTOR
LAWRENCE M. HANDLEY
BY Charles A. Warren
ATTORNEY 3,085,394
ROCKET PROPELLANT INJECTOR
Lawrence M. Handley, Tolland, Conn., assignor to United
Aircraft Corporation, East Hartford, Conn., a corporation of Delaware
Filed June 17, 1959, Ser. No. 820,902
8 Claims. (Cl. 60—35.6)

This invention relates to an injector for a rocket and especially to an injector head for use with fluid propellants.

One feature of the invention is a simplified arrangement for delivering separately to the combustion chamber of the rocket each of two propellants. Another feature is the cooling of the surface of the injector by the propellant being delivered to the combustion chamber. Another feature is the flooding of the injector surface with one propellant and simultaneously discharging the other propellant into the chamber away from the injector surface.

Another feature of the invention is an injector head consisting of a pair of chambers in side-by-side relation with passages extending from one of said chambers and through the other chamber for the delivery of propellant from the first chamber to the rocket, with other means for delivering another propellant simultaneously from the second chamber.

Other features and advantages will be apparent from the specification and claims, and from the accompanying drawing which illustrates an embodiment of the invention.

Figure 1:
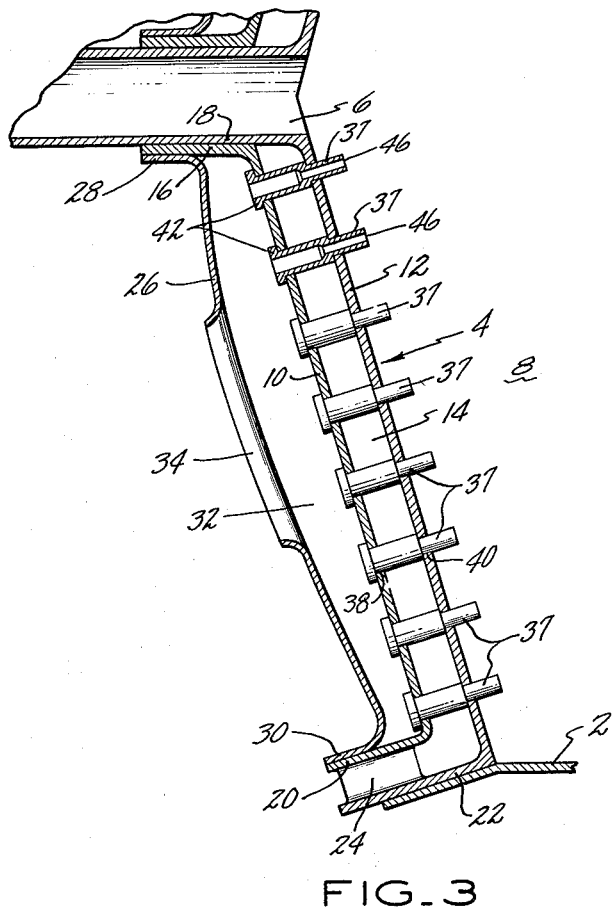
FIG. 1 is a transverse sectional view of a portion of a rocket chamber injector head.

The invention is shown in conjunction with a rocket chamber having a side wall 2 and a head 4, the latter having a centrally located opening 6 in which an ignitor, not shown, may be positioned. The head is constructed for the injection of two distinct propellants into the main rocket chamber 8. The injector head may be suitably attached to the annular side wall by any desired arrangement.

The injector head includes a main plate 10 and an inner plate 12 positioned in spaced relation to each other and defining a chamber 14 for one of the propellants. The plates 10 and 12 may have cooperating flanges 16 and 18 at their inner edges that are brazed together. At their outer edges the flanges 20 and 22 on the plates 10 and 12 may be secured in predetermined spaced relation to each other as by spacers 24 to form a passage for a flow of a propellant between these two flanges into the chamber 14.

On the side of the main plate 10 opposite to the inner plate 12 is an outer cap 26 supported as by inner and outer flanges 28 and 30 in spaced relation to the plate 10 to form a chamber 32 to which a propellant is supplied through an opening 34 in the cap.

Figure 2:
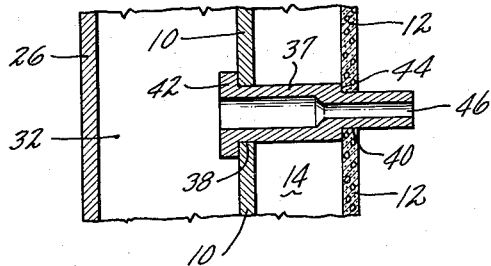
FIG. 2 is a fragmentary enlarged view of a portion of FIG. 1.
Figure 3:
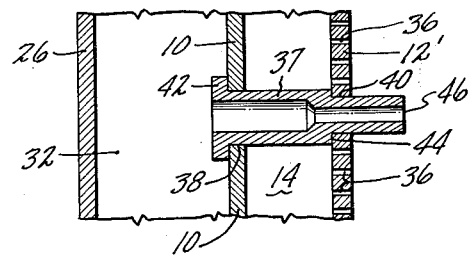
FIG. 3 is a view similar to FIG. 2 of a modification.

Propellant from the chamber 14 is discharged into the main rocket chamber 8 either by making the plate 12 porous, as in FIG. 2, or by providing a plurality of perforations 36 in the plate 12', as shown in FIG. 3. In either event, the propellant from the chamber 14 in effect floods the surface of the plate 12 or 12' thereby protecting this surface from the heat within the chamber 8.

The other propellant is sprayed into the main chamber 8 from the supply chamber 32 by a plurality of tubes 37 which extend through openings 38 in the plate 10 and other openings 40 in the plate 12 or 12'. In each case, the tube 37 is a tight fit within each opening 38 and 40 and is brazed or otherwise securely held in these openings. In the arrangement shown, the tube 37 has a flange 42 engaging with the side of the plate 10 and a shoulder 44 engaging the inner surface of the plate 12 or 12' thereby holding these two plates in proper spaced relation to each other. The tube extends into the main chamber 8 and has a discharge end or nozzle 46 which delivers propellant into the main chamber at a point spaced from the plate 12.

It will be apparent that the plates 10 and 26 are cooled by the flow of propellants through the chambers 14 and 32 and also by the transpiration or sweat cooling of the plate 12 as the propellant passes therethrough. When the device is assembled the tube 37 forms projections extending from one side of the plate 10 and through openings in the plate 12 for the discharge of a propellant through the chamber 14 without having this propellant intermingling with the propellant in the chamber 14.

It is to be understood that the invention is not limited to the specific embodiment herein illustrated and described, but may be used in other ways without departure from its spirit as defined by the following claims.

I claim:

1. An injector head for a fluid propellant rocket having a main chamber, including a first plate having a plurality of projections on one side thereof and having passages through said projections, a second plate supported in spaced relation to said first plate by said projections and having openings therein receiving and fitting around said projections, said projections extending beyond said second plate, each of said projections having a radial shoulder engaging a surface remote from said main chamber of one of said plates and a relatively reduced radial shoulder engaging the surface remote from said main chamber of the other of said plates to establish the spacing between said plates, said projections being secured to said plates, a cap spaced from said first plate and located on the side opposite to said second plate to form a propellant chamber communicating with said passages, an annular flange extending from said second plate and forming an opening in said second plate, said opening communicating with said main chamber and adapted to receive an igniter, an annular flange extending from said first plate and surrounding and joined to said annular flange extending from said second plate, and an annular flange extending from said cap and surrounding and joined to said annular flange extending from said first plate.

2. An injector head as in claim 1 in which the space between the plates defines a chamber for another propellant, and in which said second plate has openings therethrough spaced from said projections for the discharge of propellant through said second plate.

3. An injector head as in claim 1 in which the space between the plates defines a chamber for another propellant, and in which said second plate has a multiplicity of small perforations extending therethrough in spaced relation to the projections for a discharge of propellant from said second chamber.

4. An injector head as in claim 1 in which second annular flanges extend from said first and second plates, said second annular flanges being spaced apart and cooperating to form a supply passage to the space between the first and second plates, and a second annular flange extending from said cap and joined to the second flange extending from the first plate.

5. An injector for a thrust chamber, including a plate, a plurality of tubes positioned in said plate and extending from said plate on one side thereof, a second plate spaced from the first plate and having openings to receive the tubes and said second plate being spaced from the first plate to form a chamber therebetween, each of said tubes having a radial shoulder engaging a surface remote from said thrust chamber of one of said plates and a relatively reduced radial shoulder engaging the surface remote from said thrust chamber of the other of said plates to establish the spacing between said plates, said tubes being secured to said plates, said second plate having passages therein surrounding and spaced from said tubes through which propellant from said chamber is discharged, an annular flange extending from said second plate and forming an opening in said second plate, said opening communicating with said thrust chamber and adapted to receive an igniter, and an annular flange extending from said first plate and surrounding and joined to said first annular flange extending from said second plate.

6. An injector head as in claim 5 in which a cap is provided on the side of the first plate opposite to said second plate to form a propellant chamber and in which propellant from this chamber is discharged through said tubes.

7. An injector head as in claim 5 in which second annular flanges extend from said first and second plates, said second annular flanges being spaced apart and cooperating to form a supply passage to the chamber between the plates.

8. An injector head as in claim 7 in which a cap is joined to the flanges extending from one of said plates.

References Cited in the file of this patent

UNITED STATES PATENTS

| | | |
|---|---|---|
| 2,396,567 | Goddard | Mar. 12, 1946 |
| 2,405,785 | Goddard | Aug. 13, 1946 |
| 2,551,114 | Goddard | May 1, 1951 |
| 2,733,570 | MacPherson | Feb. 7, 1956 |
| 2,753,687 | Wissley et al. | July 10, 1956 |
| 2,794,316 | Winternitz | June 4, 1957 |

FOREIGN PATENTS

| | | |
|---|---|---|
| 731,739 | Great Britain | June 15, 1955 |